United States Patent [19]

Chen

[11] Patent Number: 5,525,005

[45] Date of Patent: Jun. 11, 1996

[54] COUPLING APPARATUS FOR FURNITURE

[76] Inventor: Jan-Nan Chen, No. 3, Kuang Min Street, Chien Ching District, Kaohsiung, Taiwan

[21] Appl. No.: 283,549

[22] Filed: Aug. 1, 1994

[51] Int. Cl.⁶ .................................................. A47B 47/00
[52] U.S. Cl. .......................... 403/374; 312/263; 52/584.1; 52/282.5; 403/170; 403/217; 403/231; 403/321; 403/373; 403/409.1
[58] Field of Search .................. 52/282.5, 584.1; 312/111, 263, 257.1; 403/170, 217, 231, 240, 314, 321, 322, 373, 374, 405.1, 406.1, 409.1, DIG. 10

[56] References Cited

U.S. PATENT DOCUMENTS

| 692,053 | 1/1902 | Forster | 312/111 |
|---|---|---|---|
| 3,430,997 | 3/1969 | Propst et al. | 52/584.1 |
| 3,672,710 | 6/1972 | Kroopp | 403/374 X |
| 3,830,030 | 8/1974 | Yoshida | 403/314 X |
| 4,238,164 | 12/1980 | Mazzolla | 403/109 |
| 4,811,508 | 3/1989 | Engelbach | 403/374 X |
| 4,821,788 | 4/1989 | Nelson | 403/405.1 X |
| 5,038,535 | 8/1991 | Van Praag, III | 52/127.9 |
| 5,058,347 | 10/1991 | Schuelke et al. | 403/314 X |

FOREIGN PATENT DOCUMENTS 2206684  12/1981  Germany ................... 403/409

*Primary Examiner*—Blair M. Johnson
*Assistant Examiner*—Andrea Chop
*Attorney, Agent, or Firm*—Charles E. Baxley

[57] ABSTRACT

A coupling apparatus for securing bars or boards together so as to form an article of furniture. The apparatus includes a tube engaged between the members to be secured together. Two blocks are secured to each of the members and engaged inwards of the tube. Two slides are slidably engaged in the tube and are forced toward each other in order to engage with the blocks and so as to secure the furniture members together. The slides and the blocks include wedge-shaped engaging portions engaged with each other so as to prevent the slides from rotating relative to the blocks.

1 Claim, 2 Drawing Sheets

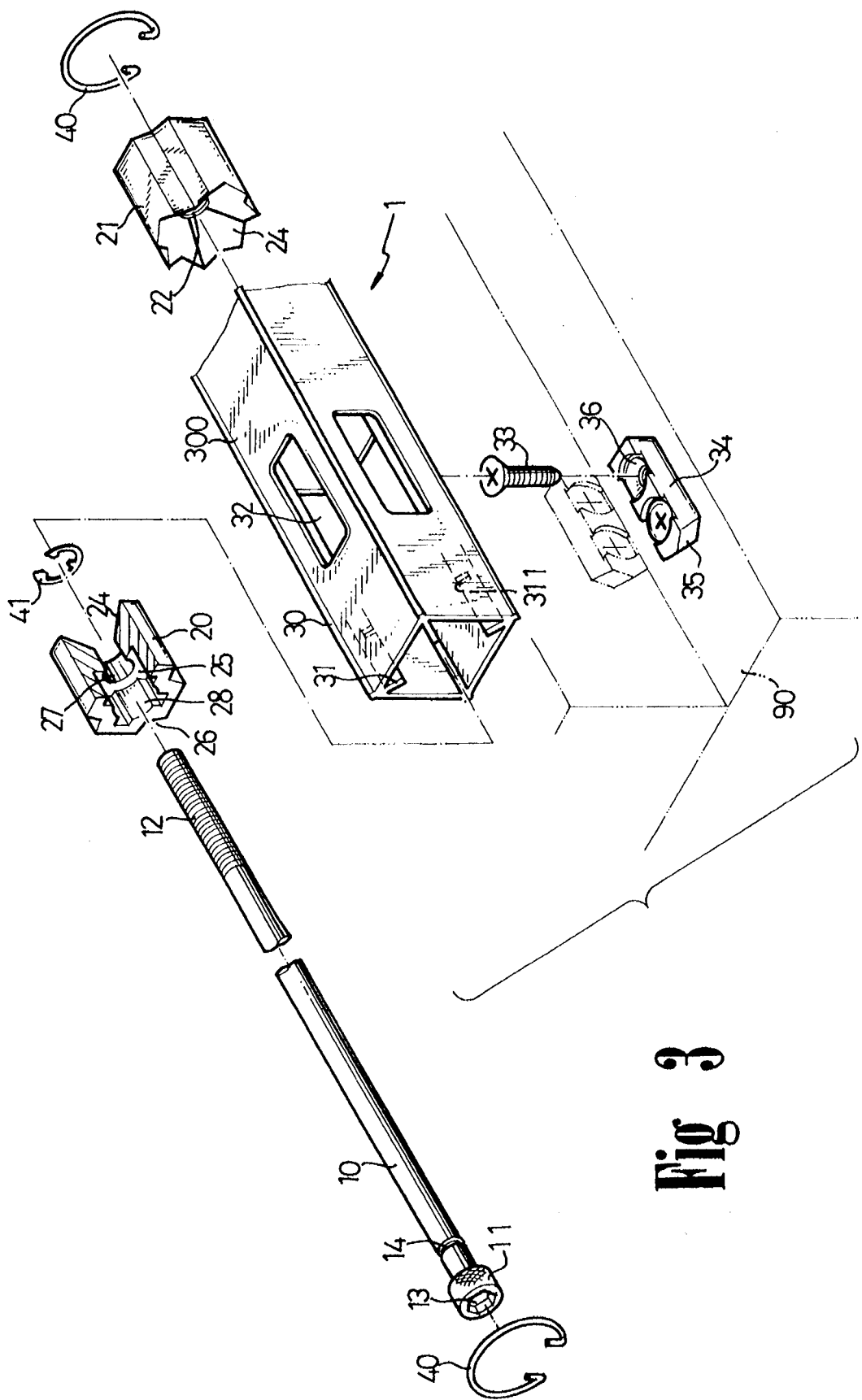

COUPLING APPARATUS FOR FURNITURE

BACKGROUND OF THE INVENTION

1. Field of the Invention

The present invention relates to a coupling apparatus, and more particularly to an apparatus for coupling bar members and board members of furniture.

2. Description of the Prior Art

Typical furniture includes a number of board members secured together by fastening means, such as screws, nails, bolts etc. For do-it-yourself furniture, a number of fastening means are required to be provided for securing the board members together. However, the board members may be easily broken by nails.

The present invention has arisen to mitigate and/or obviate the afore-described disadvantages of the conventional coupling apparatuses of furniture.

SUMMARY OF THE INVENTION

The primary objective of the present invention is to provide a coupling apparatus with which the bar members and the board members of furniture can be easily coupled together.

In accordance with one aspect of the invention, there is provided an apparatus for coupling furniture members together comprising a tube including at least three flat surfaces each having two openings formed therein, at least two pairs of blocks for fixing to at least two of the furniture members respectively, the blocks being engaged inward of the tube through the openings, the blocks each including a first engaging means formed therein, two slides slidably engaged in the tube and each including a second engaging means formed therein for engaging with the first engaging means of the blocks, the blocks being located between the slides, and means for forcing the slides toward each other so as to force the slides to engage with the blocks and so as to secure the furniture members together.

The first engaging means is a wedge-shaped portion, and the second engaging means is a wedge-shaped depression for engaging with the wedge-shaped portion so as to prevent the slides from rotating relative to the blocks.

The tube includes at least one rib longitudinally formed therein, the slides each includes at least one slot formed therein for engaging with the rib of the tube so as to guide the slides to slide within the tube and so as to prevent the slides from rotating within the tube.

The forcing means include a bolt means engaged through a first of the slides and threadedly engaged with a second of the slides, the slides are forced toward each other in order to clamp the blocks so as to secure the furniture members together when the bolt means are rotated.

Further objectives and advantages of the present invention will become apparent from a careful reading of a detailed description provided hereinbelow, with appropriate reference to accompanying drawings.

BRIEF DESCRIPTION OF THE DRAWINGS

FIG. 3 is an exploded view of the coupling apparatus.

DETAILED DESCRIPTION OF THE PREFERRED EMBODIMENT

Figure 1:
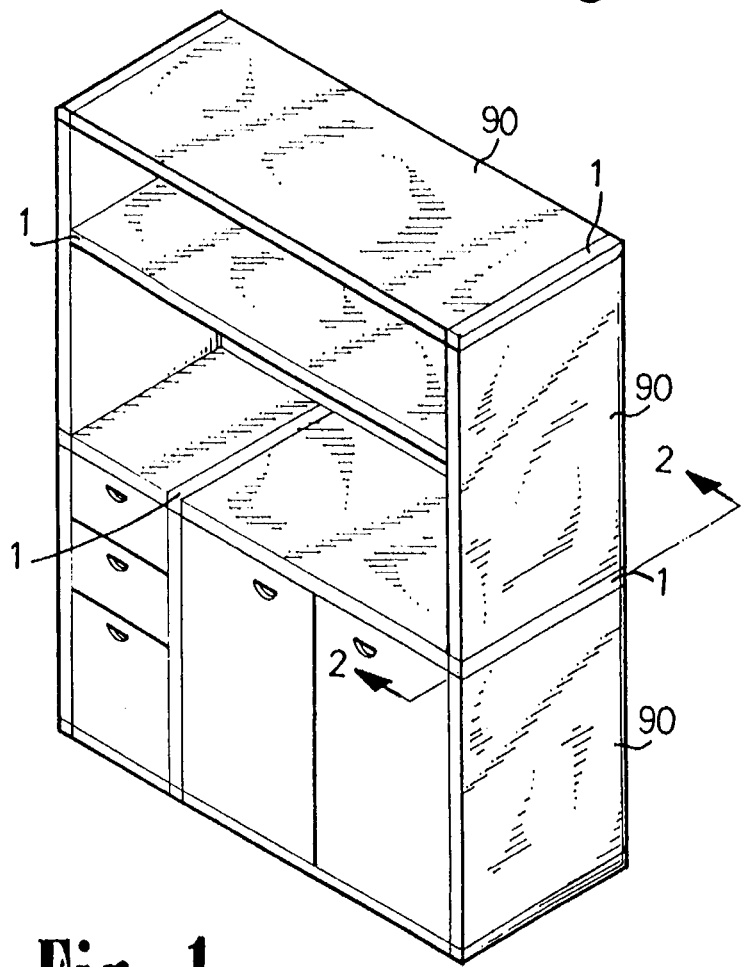
FIG. 1 is a perspective view of a cabinet employing the coupling apparatus in accordance with the present invention.

Referring to the drawings, and initially to FIG. 1, an article of furniture, such as a cabinet comprises a number of furniture members including bar members and board members 90 secured together by the coupling device 1 in accordance with the present invention.

Figure 2:
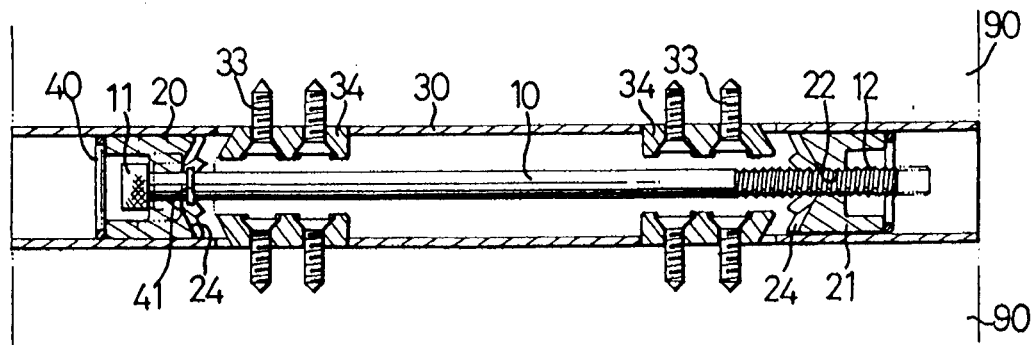
FIG. 2 is a cross sectional view taken along lines 2—2 of FIG. 1, illustrating the coupling apparatus of the present invention.

Referring next to FIGS. 2 and 3, the coupling device 1 comprises a tube 30 including a parallelogram cross section having four corner areas and having two pairs of flat surfaces 300 each having two openings 32 formed therein, and four ribs 31 formed in the four corner areas respectively. Each of the ribs 31 includes two ends each having a notch 311 formed therein for engaging with a retaining ring 40, best shown in FIG. 3. The bar members or board members 90 to be coupled together each include two blocks 34 having holes 36 formed therein for engaging with screws 33 so as to fix the blocks 34 to the board members 90. Each of the blocks 34 includes a wedge portion 35 formed on one end thereof. The blocks 34 are engaged inward of the tube 30 via the openings 32, best shown in FIG. 3.

A pair of slides 20, 21 are slidably engaged in the tube 30 and each includes four slots 26 formed in the corner areas for engaging with the ribs 31 of the tube 30 so as to guide the slides 20, 21 to slide within the tube 30 and so as to prevent the slides from rotating within the tube 30. The slide 20 includes an aperture 27 formed therein for engaging with a bolt 10 and includes a hole 28 formed therein, the hole 28 includes a larger size than that of the aperture 27 so as to form a shoulder 25 therein for engaging with the head 11 of the bolt 10. The bolt 10 includes an outer thread 12 for threadedly engaging with an inner thread 22 formed in the other slide 21, such that the slides 20, 21 may be moved toward each other by the bolt 10 such that the blocks 34 can be solidly secured between the slides 20, 21 by the bolt 10. The slides 20, 21 each include four wedge-shaped depressions 24 formed therein for engaging with the wedge portions 35 of the blocks 34 such that the blocks 34 can be solidly and stably retained between the slides 20, 21. The members 90 can thus be solidly and stably secured together by the coupling apparatus 1. The ends of the blocks 34 distal to the slides are engaged with the tube 30 such that the blocks 34 may further be retained solidly in place. The bolt 10 includes an annular groove 14 formed therein and located close to the head 11 for engaging with a retaining ring 41 so as to secure the bolt 10 to the slide 20. The head 11 includes an engaging recess 13 formed therein for engaging with a tool so as to drive the bolt 10.

Accordingly, the bar members and board members of furniture may be easily coupled together by the coupling device in accordance with the present invention.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An apparatus for coupling furniture members together comprising:

a tube including at least three flat surfaces each having two openings formed therein, said tube including at least one rib longitudinally formed therein;

at least two pairs of blocks for fixing to at least two of said furniture members respectively, said blocks being engaged inward of said tube through said openings, said blocks each including a first engaging means formed therein, said first engaging means being a wedge-shaped portion;

two slides slidably engaged in said tube and each including a second engaging means formed therein, said second engaging means being a wedge-shaped depression for engaging with said wedge-shaped portion so as to prevent said slides from rotating relative to said blocks, said blocks being located between said slides, said slides each including at least one slot formed therein for engaging with said rib of said tube so as to guide said slides to slide within said tube and so as to prevent said slides from rotating within said tube; and means for forcing said slides toward each other so as to force said slides to engage with said blocks and so as to secure said furniture members together, said forcing means including a bolt means engaged through a first of said slides and threadedly engaged with a second of said slides, said slides being forced toward each other in order to clamp said blocks so as to secure said furniture members together when said bolt means is rotated; and wherein said at least one rib of said tube includes two ribs longitudinally formed therein and each having a notch formed therein for engaging with a retaining ring, said retaining ring is engaged with said slides so as to prevent said slides from disengaging from said tube.

* * * * *